US008384748B2

(12) United States Patent
Law et al.

(10) Patent No.: US 8,384,748 B2
(45) Date of Patent: Feb. 26, 2013

(54) FABRICATION OF IMPROVED ALUMINUM ROLLERS WITH LOW ADHESION AND ULTRA/SUPER HYDROPHOBICITY AND/OR OLEOPHOBICITY BY ELECTROSPINNING TECHNIQUE IN SOLID INK-JET MARKING

(75) Inventors: Kock-Yee Law, Penfield, NY (US); Hong Zhao, Webster, NY (US); Varun Sambhy, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 763 days.

(21) Appl. No.: 12/511,625

(22) Filed: Jul. 29, 2009

(65) Prior Publication Data

US 2011/0025752 A1 Feb. 3, 2011

(51) Int. Cl.
*B41J 2/00* (2006.01)
*B29D 17/00* (2006.01)
*B05D 1/32* (2006.01)

(52) U.S. Cl. .......... 347/150; 347/20; 347/141; 347/151; 347/155; 347/161; 347/163; 347/164; 347/166; 205/68; 427/466

(58) Field of Classification Search .................... 347/20, 347/141, 150, 151, 155, 161, 163, 164, 166; 205/68; 427/466
See application file for complete search history.

(56) References Cited

U.S. PATENT DOCUMENTS 5,298,956 A * 3/1994 Mammino et al. ............ 399/308
6,645,569 B2 * 11/2003 Cramer et al. ................ 427/466
7,509,084 B2 * 3/2009 Gervasi et al. ................ 399/324
7,828,423 B2 * 11/2010 Larson et al. ................... 347/88
7,874,664 B2 * 1/2011 Gervasi et al. ................ 347/103
8,192,005 B2 * 6/2012 Law et al. ........................ 347/88
2006/0292369 A1 12/2006 Rutledge et al.
2008/0035265 A1 * 2/2008 Zaretsky et al. ............. 156/73.1
2009/0141110 A1 * 6/2009 Gervasi et al. ................ 347/100
2010/0151245 A1 * 6/2010 Law et al. ...................... 428/375

OTHER PUBLICATIONS

Tuteja, Anish, Wonjae Choi, Minglin Ma, Joseph M. Mabry, Sarah A. Mazzella, Gregory C. Rutledge, Gareth H. McKinely and Robert E. Cohen. "Designing Superoleophobic Surfaces." Science, vol. 318, Dec. 7, 2007. Sciencemag. org. Web. pp. 1618-1622.

Tuteja, Anish, Wonjae Choi, Joseph M. Mabry, Gareth H. McKinley and Robert E. Cohen. "Robust omniphobic surfaces." PNAS, vol. 105, No. 47, Nov. 25, 2008. pnas.org. Web. pp. 18200-18205.

Tuteja, Anish, Wonjae Choi, Gareth H. McKinely, Robert E. Cohen and Michael F. Rubner. "Design Parameters for Superhydrophobicity and Superoleophobicity." MRS Bulletin, vol. 33, Aug. 2008. mrs.org/ bulletin. Web. pp. 752-758.

* cited by examiner

*Primary Examiner* — Ryan Lepisto
*Assistant Examiner* — Guy Anderson
(74) *Attorney, Agent, or Firm* — MH2 Technology Law Group LLP

(57) ABSTRACT

Exemplary embodiments provide materials and methods for a printer member used in ink-jet marking systems that can include a layer electrospun over an aluminum roller to facilitate transport of a printable substrate having ink images thereon and to reduce ink offset from the printable substrate.

17 Claims, 5 Drawing Sheets

FABRICATION OF IMPROVED ALUMINUM ROLLERS WITH LOW ADHESION AND ULTRA/SUPER HYDROPHOBICITY AND/OR OLEOPHOBICITY BY ELECTROSPINNING TECHNIQUE IN SOLID INK-JET MARKING

DETAILED DESCRIPTION

1. Field of the Use

The present teachings relate generally to printer members in ink-jet marking systems and, more particularly, to printer members having low adhesion or phobicity to liquid/ink images.

2. Background

Conventional solid ink-jet printers create an image on an image substrate by melting ink and delivering the melted ink to a print-head reservoir, where it is then transferred onto the image substrate through a face plate in the print-head.

Such ink-jet printers commonly utilize either a direct printing or an offset printing architecture. In a typical direct printing system, ink is jetted from nozzles in the print-head directly onto the image substrate of a final print medium. In an offset printing system, the print-head nozzles jet the ink onto an intermediate transfer surface, such as a liquid layer on a drum. The final print medium is then brought into contact with the intermediate transfer surface and the ink image is transferred and fixed (transfixed) to the medium.

A number of backer rollers and turn rollers (or tension rollers) are used in conventional ink-jet printers. These rollers are often made of anodized aluminum and are in contact with spread and un-spread ink images depending on their location or process, e.g., a simplex or a duplex process. Ink offset occurs from the image substrate (e.g., the intermediate transfer surface or the final receiving medium) onto these aluminum rollers due to that the adhesive force between the ink image and the aluminum surface is stronger than the cohesive force within the ink image on the image substrate.

Current approaches to reduce ink offset onto these rollers include a method for increasing the ink's cohesive force by cooling the jetted ink image to a low temperature of about ~30° C., which is maintained by using a giant cooling system. After cooling, a radiant heater is needed to bring the temperature back to around 60° C., before the image substrate feeds into the spreader. This approach may cause the marking process to be narrow in latitude and energetically inefficient.

Thus, there is a need to overcome these and other problems of the prior art and to provide a printer member having low (or no) adhesion with liquid/ink images such that image offset onto the printer member can be reduced or eliminated even at a high temperature of about 60° C.

SUMMARY

According to various embodiments, the present teachings include a method for making a printer member for ink-jet marking. In this method, one or more polymeric materials can be electrospun over an aluminum roller to form the printer member that can include a surface having a reduced ink offset during an ink-jet marking process. Specifically, the printer member surface can have a contact angle of at least about 90° for an organic based ink, and a contact angle of at least about 120° for an aqueous based ink.

According to various embodiments, the present teachings also include a method for using a printer member in ink-jet marking. The printer member can include a layer electrospun over an aluminum roller. During printing, a printable substrate can be fed into a printing station along a transport path that the printable substrate moves through. An ink image can then be applied to the moving printable substrate by at least one print-head in the printing station, which further includes a plurality of backer rollers disposed on an opposite side of the moving printable substrate substantially opposite the print-head. One or more tension rollers can also be used to transport the printable substrate along the transport path into a spreader. During printing, at least one roller of the plurality of backer rollers and the one or more tension rollers can contact the ink image on the moving printable substrate and can use the printer member to reduce an ink offset thereonto. The ink image can then be spread on the moving printable substrate by the spreader.

According to various embodiments, the present teachings further include a printing apparatus that includes a printing station disposed along a transport path for a printable substrate to move through. The printing station can include at least one print-head for applying ink images to the printable substrate and a plurality of backer members disposed on an opposite side of the printable substrate substantially opposite the print-head. A spreader can be disposed downstream of the printing station along the transport path and can include an image-side roller and a pressure roller to spread the applied ink image on the printable substrate. Along the transport path, there can also be one or more tension rollers disposed to facilitate the moving of the printable substrate. In this printing apparatus, at least one of the backer members and the tension rollers can contact the ink image on the printable substrate and can include an electrospun layer disposed over an aluminum roller to facilitate transport of the printable substrate and to reduce ink offset there-onto.

Additional objects and advantages of the present teachings will be set forth in part in the description which follows, and in part will be obvious from the description, or may be learned by practice of the present teachings. The objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which, are incorporated in and constitute a part of this specification, illustrate several embodiments of the present teachings and together with the description, serve to explain the principles of the present teachings.

Figure 1:
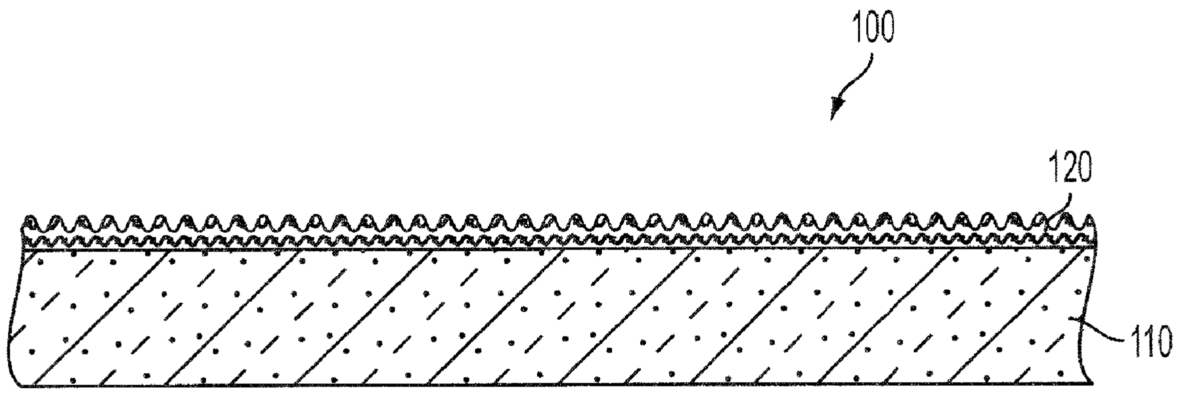
FIG. 1 depicts an exemplary printer member in accordance with various embodiments of the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Exemplary embodiments provide materials and methods for ink-jet marking systems and apparatuses. The ink-jet marking system and apparatus can include one or more printer members that are used to support or transport a printable substrate (e.g., a paper substrate) during printing and may contact jetted liquid/ink images on the continuously-moving printable substrate. To reduce or eliminate ink offset on the printer member from this contact, the printer member can include a layer electrospun over a substrate, wherein the electrospun layer can be “phobic” to liquid/ink images, i.e., having a low or no adhesion with the jetted liquid/ink images or the inked side of the printable substrate.

In one exemplary embodiment, the substrate for the disclosed printer member can include aluminum rollers as used in conventional ink-jet marking systems. The electrospun layer can be fabricated over conventional aluminum substrates using electrospinning techniques to provide an electrospun surface with oleophobicity, ultra-/super-oleophobicity, and/or ultra-/super-hydrophobicity. The electrospun surface can thus have low adhesion with liquid/ink images used in ink-jet marking systems. Image offset can then be reduced, avoided or eliminated even at a high working temperature of, e.g., about 60° C.

As used herein, the term “hydrophobicity/hydrophobic surface” and the term “oleophobicity/oleophobic surface” refer to wettability of a surface that has, e.g., a water and an oil (e.g., hexadecane, hydrocarbons, silicone oils, an organic based ink, etc.) contact angle of approximately 90° or greater, respectively. For example, on a hydrophobic (or oleophobic) surface, a ~10-15 μL water (or oil) drop can bead up and have an equilibrium contact angle of approximately 90° or greater.

As used herein, the term “ultrahydrophobicity/ultrahydrophobic surface” and the term “ultraoleophobicity/ultraoleophobic surface” refer to wettability of a surface that has a more restrictive type of hydrophobicity and oleophobicity, respectively. For example, the ultrahydrophobic (or ultraoleophobic) surface can have a water (or oil) contact angle of about 100° or greater, in some cases, about 120° or greater.

In addition, the term “super-hydrophobicity/super-hydrophobic surface” and the term “super-oleophobicity/super-oleophobic surface” refer to wettability of a surface that has an even more restrictive type of hydrophobicity and oleophobicity, respectively. For example, a super-hydrophobic (or super-oleophobic) surface can have a water (or oil) contact angle of approximately 150° or greater and can have a ~10-15 μL water (or oil) drop tend to roll freely on the surface tilted a few degrees from level. The sliding angle of the water/oil drop on a super-hydrophobic/super-oleophobic surface can be about 30 degrees or less.

FIG. 1 depicts an exemplary printer member 100 in accordance with various embodiments of the present teachings. As shown the printer member 100 can include an electrospun layer 120 disposed over a substrate 110.

It should be readily apparent to one of ordinary skill in the art that the member 100 depicted in FIG. 1 represents a generalized schematic illustration and that other components/layers can be added or existing components/layers can be removed or modified.

In various embodiments, the substrate 110 can be in a form of a roller, a drum, a cylinder, a bar, a belt, or a drelt (cross between a belt and a drum). In embodiments, the substrate 110 can be a metal substrate, such as, for example, steel and aluminum or can be a high temperature plastic substrate, such as, for example, polyimide, polyphenylene sulfide, polyamide imide, polyketone, polyphthalamide, polyetheretherketone (PEEK), polyethersulfone, polyetherimide, and polyaryletherketone.

The electrospun layer 120 can be made using a conventional electrospinning technique to produce continuous, micron/nanometer diameter fibers which can then be spun into a non-woven textile. For example, U.S. patent application Ser. No. 11/371,223 describes methods of preparation of super-hydrophobic fibers by electrospinning, the disclosure of which is hereby incorporated by reference in its entirety.

In embodiments, the electrospun layer 120 can be, for example, the electrospun layer described in co-pending U.S. patent application Ser. No. 12/335,933, entitled “Fabrication of Large Area, Textured Oil-Less Fusing/Fixing Surfaces by Electrospinning Technique,” the disclosure of which is incorporated herein by reference in its entirety.

Figure 1A:
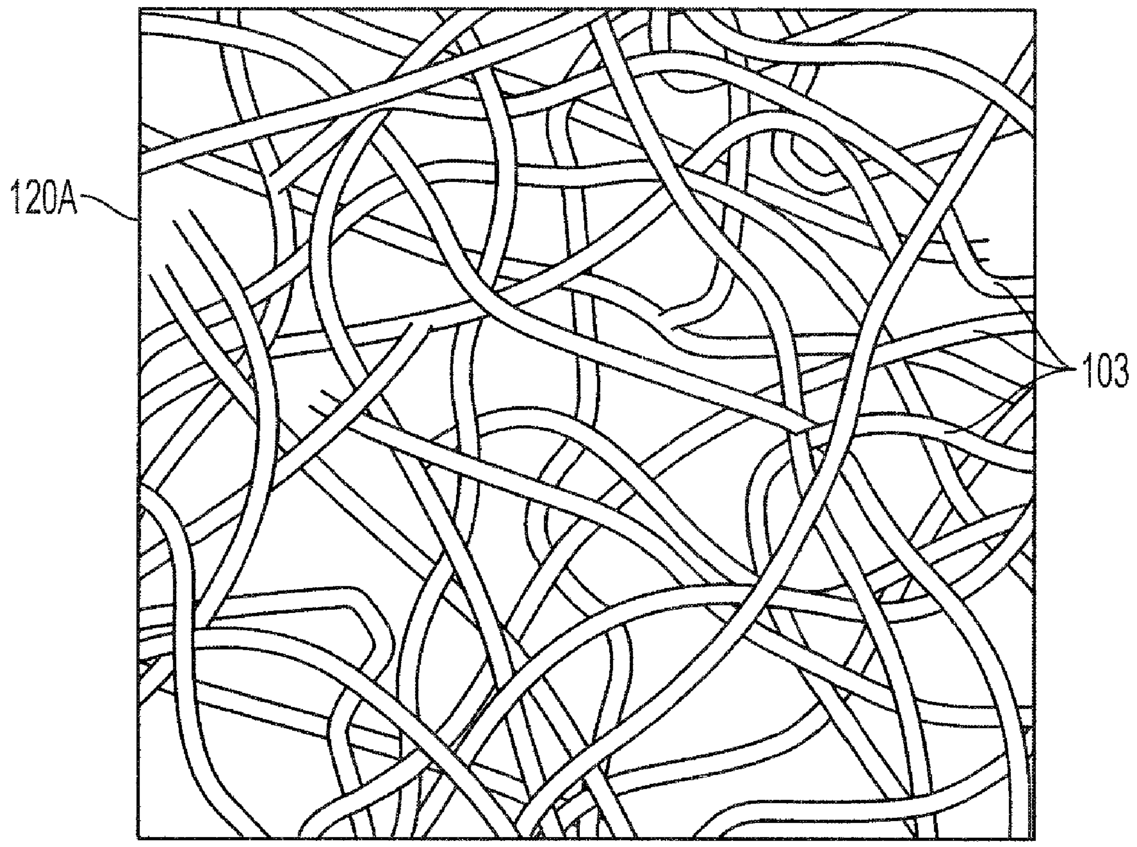
FIGS. 1A-1C depict exemplary electrospun structures of an printer member in accordance with various embodiments of the present teachings.
Figure 1B:
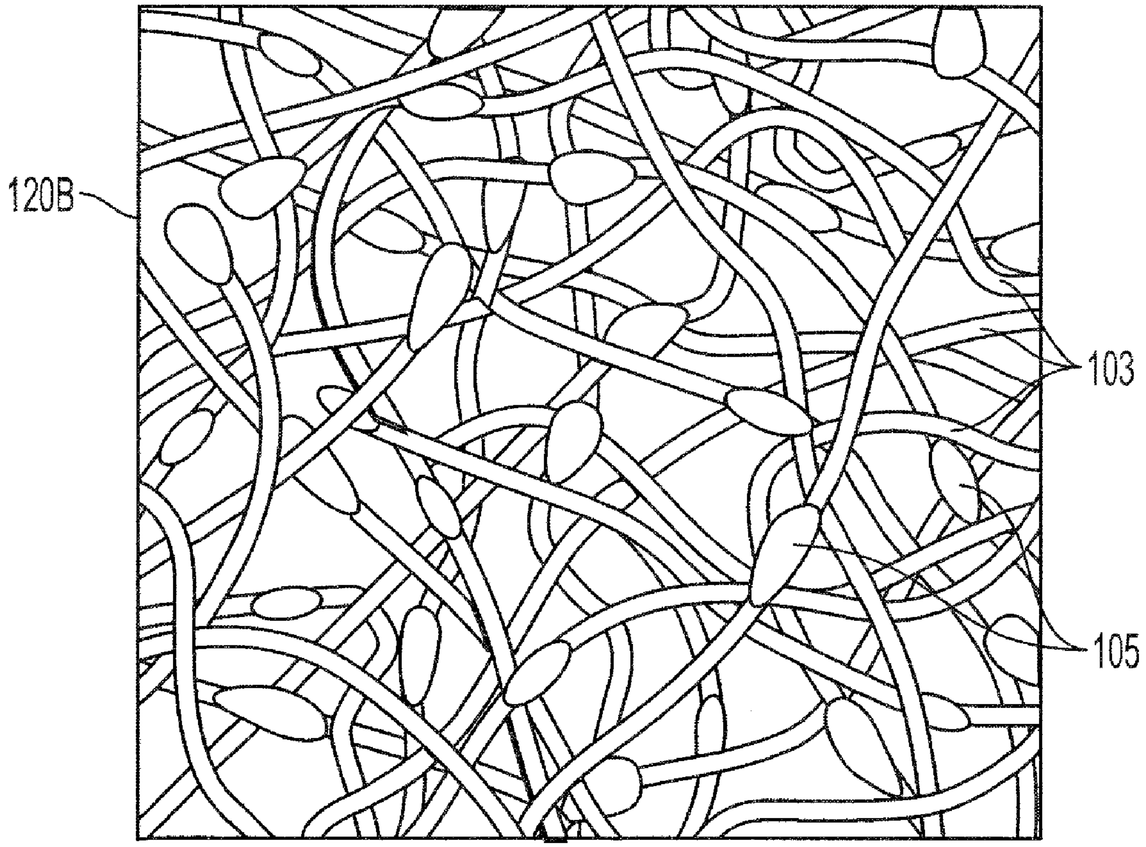
Figure 1C:
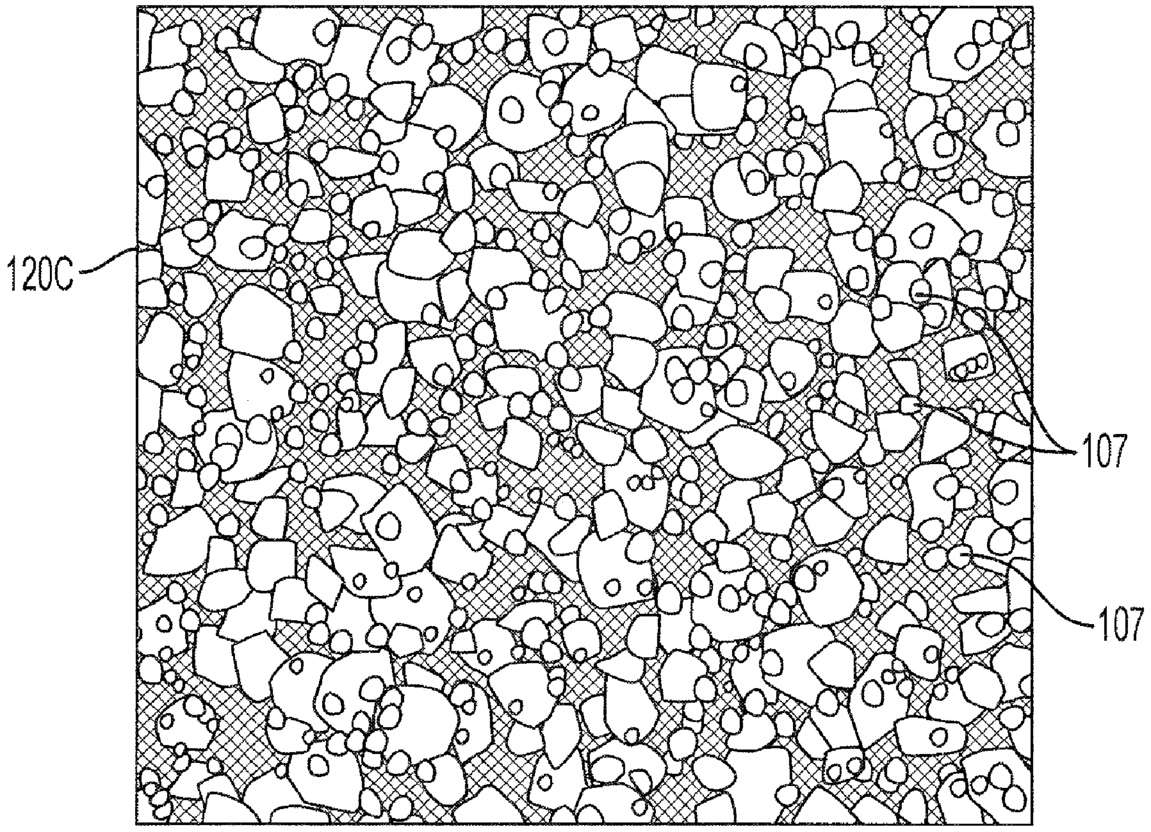

In embodiments, the electrospun layer 120 can include a structure such as, for example, a fiber 103 on fiber 103 (fiber-on-fiber) structure 120A shown in FIG. 1A, a particle 105 on fiber 103 (particle-on-fiber) structure 120B shown in FIG. 1B, and/or a popcorn 107 structure 120C shown in FIG. 1C. In various embodiments, the electrospun fibers 103 can have a diameter in the range of about 1 nm to about 10 μm, and in some cases, in the range of about 10 nm to about 2 μm. In various embodiments, the electrospun fibers 103 can have one or more particles, for example, disposed on the electrospun fiber surface and/or completely or partially embedded in the electrospun fibers, wherein the particles can have a particle size ranging from about 1 nm to about 10 μm. In embodiments, such electrospun fibers incorporated with the one or more particles can form the particle-on-fiber structure 120B.

In embodiments, the electrospun layer 120 can also be porous having a porosity in the range of about 10% to about 99%, and in some cases from about 50% to about 95%, wherein the pores can have an average size in the range of about 50 nm to about 50 μm, and in some cases, in the range of about 100 nm to about 5 μm. In various embodiments, the electrospun layer 120 can have a thickness from about 1 μm to about 5 mm, and in some embodiments, from about 5 μm to about 2 mm.

While not intending to be bound by any specific theory, it is believed that the hydrophobicity and/or oleophobicity of the electrospun layer 120 can be controlled by the structure: fiber-on-fiber structure 120A, a particle-on-fiber structure 120B, and/or a popcorn structure 120C and the contact angle can be further fine tuned by adjusting the porosity, the size of pores, electrospun fiber diameter, etc.

Furthermore, any suitable polymeric material, hydrophobic, hydrophilic and/or oleophobic material, can be used to form the electrospun layer 120 that is oleophobic, ultra-/super-oleophobic, and/or ultra-/super-hydrophobic.

Exemplary polymeric materials can include, but are not limited to, one or more polymers selected from the group consisting of polystyrene; polymethyl-methacrylate (PMMA); polyhedral oligomeric silsesquioxane (POSS); poly(vinyl alcohol); poly(ethylene oxide); polyacrylonitrile;

polylactide; poly(caprolactone); poly(ether imide); polyurethanes; poly(ether urethanes); poly(ester urethanes); aliphatic polyamides; aromatic polyamides; poly(p-phenylene terephthalate); cellulose acetate; poly(vinyl acetate); poly (acrylic acid); polyacrylamide; polyvinylpyrrolidone; hydroxypropylcellulose; poly(vinyl butyral); poly(alkyl acrylates); poly(alkyl methacrylates); polycarbonate; polyhydroxybutyrate; polyimides; poly(vinylidene fluoride); poly (vinylidene fluoride-co-hexafluoropropylene); fluorinated ethylene-propylene copolymer); poly(tetrafluoroethylene-co-perfluoropropyl vinyl ether); Teflon® PFA; and poly((perfluoroalkyl)ethyl methacrylate).

In one exemplary embodiment, polymer that itself exhibits low adhesion and moderate water and/or oil contact angles with liquid/ink images, e.g., of about 70 degrees, can be electrospun to prepare an electrospun coating or the electrospun layer 120 with a lower adhesion, ultra-oleophobicity and/or ultra-hydrophobicity having a respective water/oil contact angle of, e.g., at least about 100 degrees.

In certain embodiments, the electrospun layer 120 can further include one or more additives to enhance material properties, such as, for example, the surface hydrophobicity, surface oleophobicity, mechanical strength, electrical conductivity, and/or thermal conductivity. The additives can include carbon nanotubes, carbon nanofibers, silica, clay, metal oxides nanoparticles, such as, for example, titanium oxide, aluminum oxide, and indium tin oxide and/or mixtures thereof.

In various embodiments, the electrospun layer 120 can be a cross-linked electrospun layer created using one or more of heat, UV radiation, electron-beam, and a chemical reagent so as to improve its mechanical toughness.

In various embodiments, depending on the polymer used, the starting materials and the post treatment of the electrospinning process, the disclosed electrospun layer 120 can allow for a textile structure having dual (micro/nano) scale roughness, offering super-oleophobicity and/or super-hydrophobicity to the formed electrospun layer 120.

For example, the electrospun layer 120 can include polymers with low adhesion towards ink, such as those made by cross-linking a diisocyanate with a hydroxyl-functionalized polyester in a solvent in the presence of a polysiloxane additive and optimally a fluorolink crosslinker. Particular polymers disclosed herein can be made by, for example, mixing component 1, hydroxyl-terminated polyacrylate, (Desmophen A870 BA, from Bayer Material Science, Leverkusen, Germany), and component 2, hexamethylene diisocyanate (Desmodur N-3300A from Bayer Material Science, Leverkusen, Germany) in n-butyl acetate. Polysiloxane additives, for example, obtained under the trade name Silclean™ 3700 (BYK, Wesel, Germany), and hydroxyl functional silicone modified polyacrylate, for example, from BYK (Wesel, Germany), can be added in various amounts, such as from about 2% to about 10% by weight in relative to the main polymer. In an exemplary embodiment, after coating and drying at 135° C. for about 30-60 minutes, a low-adhesion polymer coating can be obtained Optionally, a fluoro cross-linker, for example, know as Fluorolink, particularly known as Fluorolink-D from Solvay Solexis (Bollate (MI), Italy) can be added to the coating solution in an amount ranging from about 0.01% to about 5% to increase the contact angle of the final coating of the exemplary electrospun layer. Table 1 depicts data for the exemplary polyurethane based polymers with varying Silclean and Fluorolink additives.

TABLE 1

| | | Water | | Hexadecane | |
|---|---|---|---|---|---|
| % Silclean | % Fluorolink-D | Contact angle | Sliding angle | Contact angle | Sliding angle |
| 0 (Control) | 0 (Control) | ~70° | ~51° | ~22° | ~90° |
| 2 | 0 | ~93° | ~30° | ~31° | ~5° |
| 8 | 0 | ~100° | ~23° | ~34° | ~2° |
| 2 | 0.5 | | | ~59° | ~21° |
| 2 | 2 | | | ~62° | ~22° |
| 8 | 0.5 | | | ~55° | ~16° |
| 8 | 2 | | | ~62° | ~21° |
| PTFE (comparison) | | ~118° | ~64° | ~48° | ~31° |

In specific examples shown in Table 1, the sliding angles of water and hexadecane on the electrospun layers (at 105 degree C.) were found no more than 30°. The low sliding angles indicate that both aqueous based solid ink and organic based solid ink have low adhesion to these exemplary electrospun layers.

In an exemplary embodiment, simulation programs can be used to characterize and compare the disclosed electrospun layer with non-electrospun layers in accordance with various embodiments of the present teachings. In one embodiment, according to the simulation, the disclosed electrospun layer/overcoat can be super-hydrophobic or super-oleophobic having significantly less adhesion with solid ink. Similar electrospun coatings that can be used for the disclosed printer member 100 are disclose in Science in an article entitled "Designing Superoleophobic Surfaces," in PNAS in an article entitled "Design Parameters for Superhydrophobicity," and in MRS in an article entitled "Robust omniphobic surfaces," the disclosures of which are incorporated herein by reference in their entirety.

In various embodiments, the aluminum roller 110 can have a first order surface roughness crated by, for example, a super finishing or an etching process. The electrospun layer 120 can then be formed over the roughed aluminum roller surface.

In various embodiments, the disclosed printer member 100 can further include, for example, a conformal layer disposed over the electrospun layer 120. The conformal layer can be made of a material including, but not limited to, fluorinated silane, (perfluoroalkyl)ethyl methacrylate, polytetrafluoroethylene, silicone, and fluorosilicone.

In various embodiments, the disclosed printer member 100 can be any transport member in a printing apparatus, which contacts ink images and/or inked-side of a printable substrate, and requires a release from the ink images of the printable substrate after the contact.

Various inks can be used in printer apparatuses. In one embodiment when aqueous based inks are used, the hydrophobic, or ultra-/super-hydrophobic electrospun layer 120 of the disclosed printer member can provide ink-phobic property with low adhesion to the aqueous based inks and be released from them for advancing the moving printable substrate.

In another embodiment when solid ink, UV ink and/or other organic solvent based inks are used, the oleophobic, or ultra-/super-oleophobic electrospun layer 120 can provide ink-phobic property with low adhesion to the organic based inks and be released from them for advancing the moving printable substrate.

In one embodiment, the disclosed printer member 100 can include a roller substrate and a surface as described in co-pending patent application Ser. No. 12/511,179, entitled "Rollers for Phase-Change Ink Printing," and filed concurrently herewith on Jul. 29, 2009, which is commonly assigned to Xerox Corp., and incorporated by reference in its entirety herein.

In this manner, due to the low adhesion or surface phobicity to various inks, the disclosed printer member 100 can provide many advantages over conventional members. For example, the disclosed printer member 100 can be used as a backer member and/or a tension member in a simplex direct printing and/or in a duplex direct printing, in order to reduce or eliminate ink offset to the backer members and the tension members. Other members used in a printer that transport a moving printable substrate on an inked side can also use the disclosed printer member 100.

In embodiments, any transport substrates used in printing apparatuses can have an electrospun layer formed there-over. The transport substrate can include the substrate 110 as disclosed herein. In embodiments, the transport substrate can include a backer member substrate such as a backer roller substrate or a backer bar substrate, and/or a tension member substrate such as a tension roller substrate. In a specific embodiment, the transport substrate 110 can be an aluminum roller or drum.

Figure 2:
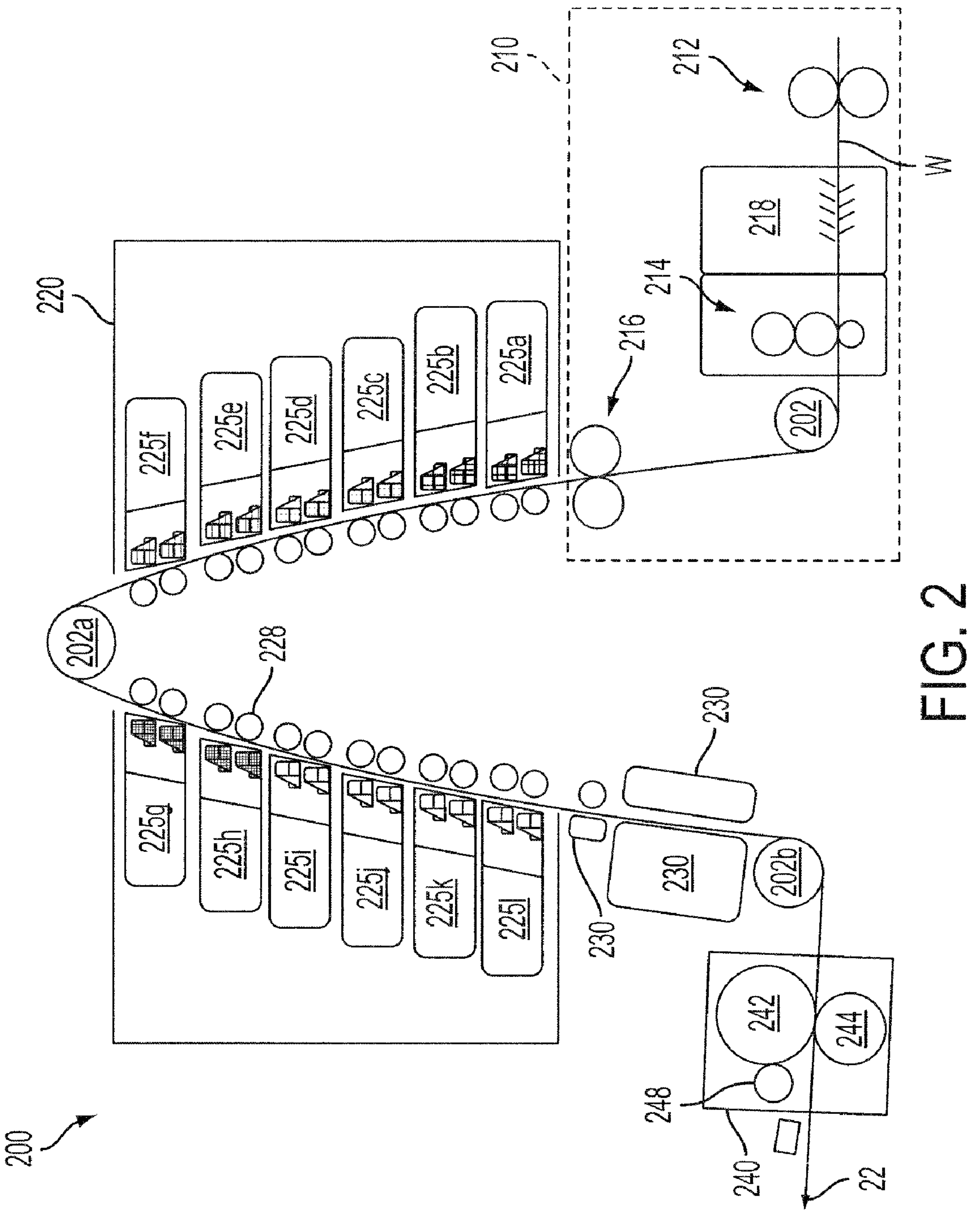
FIG. 2 is a simplified schematic of an exemplary solid-ink printer in accordance with various embodiments of the present teachings.

In various embodiments, the disclosed printer member 100 can be used in, for example, a solid ink-jet printer such as a direct marking solid ink-jet printer. FIG. 2 is a simplified schematic of an exemplary solid-ink printer 200 in accordance with various embodiments of the present teachings. It should be readily apparent to one of ordinary skill in the art that the printer 200 depicted in FIG. 2 represents a generalized schematic illustration and that other components/members can be added or existing components/members can be removed or modified.

As shown, the exemplary printer 200 can be a direct-to-sheet ink printer and can include a sheet feeder system 210, a printing station 220, mid heaters 230 and a spreader 240.

As shown in FIG. 2, a substantially continuous web W of a printable substrate or a print medium including, for example, paper, plastic, or other printable material, can be supplied from a sheet feeder system 210 and propelled by a variety of components 212, 214 and 216 in the system 210. A set of tension members (also referred to as turn members), such as a set of tension rollers 202, 202*a/b* can control the tension of the unwinding web or printable substrate as the web moves through a transport path in a direction 22 during printing. Along the transport path, a preheater 218 can be provided, which brings the web to an initial predetermined temperature. The preheater 218 can rely on contact, radiant, conductive, or convective heat to bring the web W to a target preheat temperature, in one practical embodiment, of about 40° C. to about 70° C.

The web W can then move through a printing station 220 including a series of print-heads 225 A-L, for example, each print-head effectively extending across the width of the web and being able to place ink of one primary color directly onto the moving web W (i.e., without use of an intermediate or offset member in this case). In an exemplary embodiment, solid ink can be directed to the web W. Typically, solid ink can be substantially solid at room temperature and substantially liquid when initially jetted onto the web W.

Associated with each primary color print-head, there can be a plurality of backer members 228, in the form of a bar or a roller, which can be arranged substantially opposite the print-head on the other side of the web W. Each backer member 228 can be used to position the web W so that the gap between the print-head and the web sheet stays at a known, constant distance. The combined actions of preheater 218 plus backer members 228 held to a particular target temperature effectively maintains the web W in the printing zone 220 in a predetermined temperature range of about 40° C. to about 70° C. As the partially-imaged medium moves to receive inks of various colors throughout the printing station 220, it is required that the temperature of the web W is maintained within a given range.

In an exemplary embodiment involving a duplex marking process capable of producing duplex, or two-sided, prints, the backer members 228 can be in direct contact with ink images when the printable substrate has received a first-side ink image and moves to an inverter and a duplex loop (not illustrated), which re-feeds the printable substrate to receive the second-side ink image but having the first-side ink image contacting the backer members 228, and the tension roller 202*a* in the illustrated example. As disclosed herein, the backer members 228 or related tension rollers 202*a* can use the printer member 100 including an electrospun layer (e.g., 120 in FIG. 1) with desired ink-phobic properties over a substrate (e.g., 110 in FIG. 1), so as to reduce and/or eliminate ink offset from the first-side ink images onto the involved backer members 228 and tension rollers 202*a* during the duplex printing process.

In an exemplary embodiment involving a simplex marking process, although the backer members 228 may not have direct contact with ink images, the disclosed printer member 100 can be used as backer members in various embodiments.

In the prior art, in order to reduce ink offset from the web substrate to these related backer members or tension rollers, e.g., aluminum rollers, a giant cooling system is used to maintain these rollers at low temperatures of about ~30° C. for increasing ink cohesive force over the adhesion between the ink images and the aluminum rollers. After cooling, a mid-heater has to be used to bring the temperature up to ≧60° C. before the web substrate feeds into the spreader.

By using the disclosed printer member 100, for example, by applying an electrospun layer over conventional tension rollers or backer members to form the exemplary tension rollers 202*a/b*, and/or backer rollers 228. Such electrospun layers or coatings can eliminate the need to actively cool the rollers and the web to avoid ink offset during transport, and can also lessen the extent to which reheating must be used to prepare the web for subsequent steps of the marking process, i.e., the spreading using the spreader 240.

Following the printing zone 220 along the web transport path in the direction 22, there can include one or more mid heaters 230. The mid heaters 230 can use contact, radiant, conductive, and/or convective heat to bring the web W to a target temperature. The mid heaters 230 can bring the ink image placed on the web W to a temperature suitable for desired properties when the ink on the web is sent through the spreader 240. In one embodiment, a useful range for a target temperature for the mid heater can be about 40° C. to about 70° C. The mid heaters 230 can have the effect of equalizing the ink image and web temperatures and adjust web W and ink temperatures related to the temperature of the following spreader 240.

The set of tension rollers 202 can be used to facilitate the web moving through the transport path in the direction 22 and may be in direct contact with ink images during printing. For example, following the mid heaters 230, along the transport path 22 of web W, the tension roller 202*b* can be used to transport the web into a spreader 240 and can directly contact the inked-side of the printable substrate. The tension roller 202*b* can thus use the disclosed printer member 100 to provide desired hydrophobic and/or oleophobic surfaces from the electrospun layer 120 and provide low adhesion to an aqueous ink and/or an organic based ink.

The spreader 240 can apply a predetermined pressure, and in some implementations, heat, to the web W. The spreader 240 can be functioned to take what are essentially isolated droplets of ink on web W and smear them out to make a continuous layer by pressure, and, in one embodiment, heat, so that spaces between adjacent drops are filled and image solids become uniform. In addition to spreading the ink, the spreader 240 can also improve image permanence by increasing ink layer cohesion and/or increasing the ink-substrate adhesion The spreader 240 can include rollers, such as image-side roller 242 and pressure roller 244 that apply heat and pressure to the web W. Either roller can include heat elements (not shown) to bring the web W to a desired temperature.

The spreader 240 can be a typical spreader, for example, including a cleaning/oiling station 248 associated with image-side roller 242. In one possible embodiment, the mid heaters 230 and spreader 240 can be combined within a single unit, with their respective functions occurring relative to the same portion of web W simultaneously.

Various embodiments can also include a method for using the disclosed printer member in ink-jet marking system. During printing, a printable substrate can be fed into a printing station along a transport path that the printable substrate moves through. An ink image can then be applied or jetted to the moving printable substrate by at least one print-head. The printing station can also include a plurality of backer rollers disposed on an opposite side of the printable substrate substantially opposite the print-head. In various embodiments, the disclosed printer member 100 can be used as a backer roller, if the backer roller is required to contact the ink image on the moving printable substrate depending on the process, for example, for a duplex printing or marking. One or more tension rollers can also be used to transport the printable substrate along the transport path into a spreader. In various embodiments, the disclosed printer member 100 can be used as a tension roller, if the tension roller contacts the ink image on the moving printable substrate, for example, for a duplex printing or a simplex printing The ink image on the moving printable substrate can then be spread in the spreader.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms “including,” “includes,” “having,” “has,” “with,” or variants thereof are used in either the detailed description and the claims, such terms are intended to be inclusive in a manner similar to the term “comprising.”

Further, in the discussion and claims herein, the term “about” indicates that the value listed may be somewhat altered, as long as the alteration does not result in nonconformance of the process or structure to the illustrated embodiment. Finally, “exemplary” indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method for making a printer member for ink-jet marking comprising:

providing an aluminum roller;

roughing a surface of the aluminum roller by a finishing process or an etching process; and electrospinning one or more polymeric materials over the roughed surface of the aluminum roller to form a printer member having a reduced ink offset to the printer member surface during an ink-jet marking process;

wherein the printer member surface has a contact angle of at least about 90° for an organic based ink, and a contact angle of at least about 120° for an aqueous based ink.

2. The method of claim 1, wherein the print member surface further has a contact angle of at least about 90° for hexadecane, hydrocarbon, silicone oil, or the organic based ink, and a contact angle of at least about 120° for water or the aqueous based ink.

3. The method of claim 1, wherein the print member further has a sliding angle of about 30° or less for hexadecane, hydrocarbon, silicone oil, water, the organic based ink, or the aqueous based ink.

4. The method of claim 1, wherein electrospinning one or more polymeric materials over the aluminum roller forms a plurality of electrospun fibers having a diameter ranging from about 1 nm to about 10 μm.

5. The method of claim 1, wherein electrospinning one or more polymeric materials over the aluminum roller results in an electrospun layer comprising a fiber-on-fiber structure, a particle-on-fiber structure, or a pop-corn structure over the aluminum roller.

6. The method of claim 5, wherein the electrospun layer has an average pore size ranging from about 50 nm to about 50 μm.

7. The method of claim 5, wherein the electrospun layer has a porosity ranging from about 10% to about 99%.

8. The method of claim 5, wherein the particle-on-fiber structure of the electrospun layer comprises one or more particles formed on an electrospun fiber surface or at least partially embedded in an electrospun fiber, wherein the one or more particles have a particle size ranging from about 1 nm to about 10 μm.

9. The method of claim 1, further comprising using one or more of heat, UV radiation, electron-beam, and a chemical reagent to form a cross-linked electrospun layer to increase a mechanical toughness thereof.

10. The method of claim 1, further comprising electrospinning one or more polymeric materials selected from the group consisting of polystyrene; polymethyl-methacrylate (PMMA); polyhedral oligomeric silsesquioxane (POSS); poly(vinyl alcohol); poly(ethylene oxide); polyacrylonitrile; polylactide; poly(caprolactone); poly(ether imide); polyurethanes; poly(ether urethanes); poly(ester urethanes); aliphatic polyamides; aromatic polyamides; poly(p-phenylene terephthalate); cellulose acetate; poly(vinyl acetate); poly (acrylic acid); polyacrylamide; polyvinylpyrrolidone; hydroxypropylcellulose; poly(vinyl butyral); poly(alkly acrylates); poly(alkyl methacrylates); polycarbonate; polyhydroxybutyrate; polyimides; poly(vinylidene fluoride); poly (vinylidene fluoride-co-hexafluoropropylene); fluorinated ethylene-propylene copolymer); poly(tetrafluoroethylene-co-perfluoropropyl vinyl ether); Teflon® PFA; poly((perfluoroalkyl)ethyl methacrylate) and a mixture thereof.

11. The method of claim 1, further comprising disposing a conformal layer over the electrospun materials to form the printer member, wherein the conformal layer is made of a material selected from the group consisting of fluorinated silane, (perfluoroalkyl)ethyl methacrylate, polytetrafluoroethylene, silicone, and fluorosilicone.

12. A printer member for an ink-jet marking system fabricated according to the method of claim 1, wherein the ink-jet marking system comprises a solid ink-jet marking system.

13. A method for using a printer member in ink-jet marking comprising:

providing a printer member comprising a layer electrospun over a roughed surface of an aluminum roller;

feeding a printable substrate into a printing station along a transport path for the printable substrate to move through;

applying an ink image to the moving printable substrate by at least one print-head in the printing station that further comprises a plurality of backer rollers disposed on an opposite side of the moving printable substrate substantially opposite the print head; and using one or more tension rollers to transport the printable substrate along the transport path, wherein at least one roller of the plurality of backer rollers and the one or more tension rollers contacts the ink image on the printable substrate and comprises the printer member to reduce an ink offset there-onto.

14. The method of claim 13, wherein the electrospun layer of the printer member has a contact angle of at least about 90° for an organic based ink image, and has a contact angle of at least about 120° for an aqueous based ink image.

15. The method of claim 13, further comprising using the printer member as a tension roller in a duplex marking process or a simplex marking process.

16. The method of claim 13, further comprising using the printer member as a backer roller of the plurality of backer rollers in a duplex marking process.

17. The method of claim 13, further comprising roughing the surface of the aluminum roller by a finishing process or an etching process.

* * * * *